United States Patent [19]

Gutleber

[11] 4,215,244
[45] Jul. 29, 1980

[54] SELF-ADAPTIVE MOBILE SUBSCRIBER ACCESS SYSTEM EMPLOYING TIME DIVISION MULTIPLE ACCESSING

[75] Inventor: Frank S. Gutleber, Little Silver, N.J.

[73] Assignee: The United States of America as represented by the Secretary of the Army, Washington, D.C.

[21] Appl. No.: 970,608

[22] Filed: Dec. 18, 1978

[51] Int. Cl.² .............................................. H04J 3/14
[52] U.S. Cl. ...................................... 370/116; 370/13
[58] Field of Search .......... 179/15 BZ, 15 BF, 15 BS, 179/2 EB, 2 E, 15 AN

[56] References Cited

U.S. PATENT DOCUMENTS

| | | | |
|---|---|---|---|
| 3,239,761 | 3/1966 | Goode | 179/2 EB |
| 3,457,373 | 7/1969 | Van Duuren et al. | 179/15 BF |
| 3,461,451 | 8/1969 | Gutleber | 340/348 |
| 3,519,746 | 7/1970 | Gutleber | 340/354 |
| 3,634,765 | 1/1972 | Gutleber | 179/15 BC |
| 3,715,503 | 2/1973 | Jungbluth et al. | 179/15 BF |

Primary Examiner—Douglas W. Olms
Attorney, Agent, or Firm—Nathan Edelberg; Jeremiah G. Murray; Daniel D. Sharp

[57] ABSTRACT

A time division multiple access mobile communications system employing a self-adaptive feature and perfect noise codes to enable utilization of the system. The self-adaptive feature permits switching to vacant channels as interfering users move to an occupied channel. The noise codes employed are of the type termed code mates having correlation functions which upon detection provide an impulse autocorrelation function. The described arrangement enables random access to be accomplished with minimal interference between users. Large improvements in signal-to-noise power ratio and in signal-to-jamming power ratio will be seen to result.

9 Claims, 5 Drawing Figures

SELF-ADAPTIVE MOBILE SUBSCRIBER ACCESS SYSTEM EMPLOYING TIME DIVISION MULTIPLE ACCESSING

The invention described herein may be manufactured and used by or for the Government for governmental purposes without the payment of any royalties thereon or therefor.

FIELD OF THE INVENTION

This invention relates to mobile communications systems and, more particularly, to a mobile subscriber accessing system utilizing direct call-up with omnidirectional antennas.

BACKGROUND OF THE INVENTION

As is well known and understood, one of the problems associated with mobile subscriber accessing systems offering direct call-up is that of interference between users. As is also well known and understood, this results from the utilization in such communications systems of omnidirectional antennas. Attempts at utilizing such antennas with very narrow pulses to reduce the probability of self-interference has been shown to be limited. Use of time division multiple accessing, by itself, has not completely solved the interference problem, as signals from moving transmitters often threaten the channel (or time slot) in which another signal is being received. Interference has especially been found prevalent when a call-up is first initiated, before any synchronized acquisition is first established. Although time division multiple accessing communications systems have been developed where directional antennas have been used (see, for example, my issued U.S. Pat. No. 3,908,088), no such workable implementation has been proposed for the mobile arena where omnidirectional antennas are utilized.

SUMMARY OF THE INVENTION

As will become clear hereinafter, the mobile subscriber access system of the present invention employs time division multiple accessing along with a self-adaptive feature which permits monitoring as to how the used channels (or time slots) vary, and to switch to a vacant channel when another user moves so as to threaten that channel which is occupied, in an interfering manner. Thus, when interfering sources are identified, either at initiation of the direct call-up or during communications while on the move, a loop-around timing control is established to enable the user to keep his received pulse signal in an unused time slot. Additionally, the mobile subscriber access system will be seen to be orthogonal in operation, such that perfect (i.e. lobeless) noise codes could be utilized to provide jamming protection and range extension capabilities.

BRIEF DESCRIPTION OF THE DRAWINGS

These and other features of the present invention will be more readily understood from a consideration of the following description taken in connection with the accompanying drawings in which:

FIG. 3 is a functional block diagram showing the loop-around timing control providing the self-adaptive feature, whereby the timing of the transmitted pulses of each user is controlled by the receiver of the user he is communicating with;

DETAILED DESCRIPTION OF THE DRAWINGS

Figure 1:
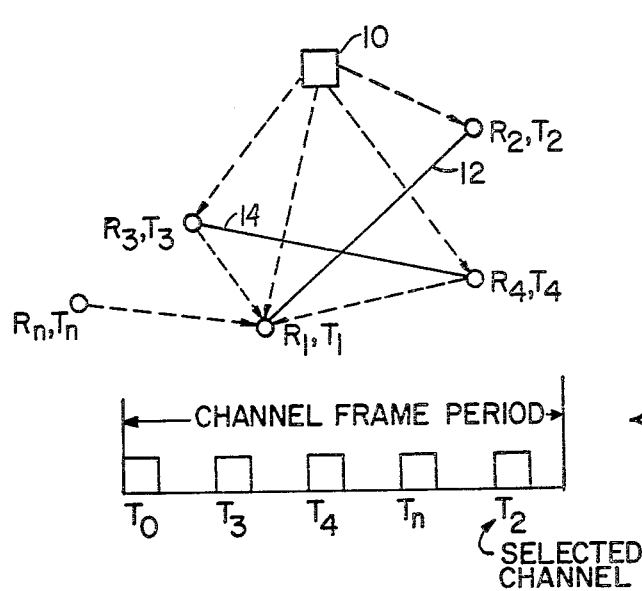
FIG. 1 is a simplified illustration of a self-adaptive mobile subscriber access system employing time division multiple accessing according to the invention.

The arrangement of FIG. 1 pictorially illustrates a mobile subscriber access system employing time division multiple accessing in which all users of the system are provided with a synchronous time reference 10. Such referencing may be accomplished in any appropriate manner, such that each mobile user could select an available channel (or time slot) for its communication. Thus, one user $R_1,T_1$ is in receipt of communications signals from a second user $R_2,T_2$ along the mobile link 12 during the time slot $T_2$, a third user $R_3,T_3$ is in receipt of communications signals from a fourth user $R_4, T_4$ along the mobile link 14 during the time slot $T_4$, etc., through n other users communicating along different mobile links. As indicated in the inset alongside FIG. 1, the pulse communications received at user $R_1,T_1$ are: the reference clock pulse $T_0$, communication transmissions $T_3$, $T_4$ and $T_n$ from other users during the channel frame period indicated, and the pulse information $T_2$ which is received from the user $R_2,T_2$ along the selected channel between which the users $R_1,T_1$ and $R_2,T_2$ are communicating. As will be readily appreciated, if each user were provided with a reasonably stable clock controlled by its own crystal oscillator, no need would exist for the external clock reference 10. In accordance with the self-adaptive feature of the invention, and as will be seen below, the receiver of user $R_1,T_1$ controls the transmitter timing of user $R_2,T_2$, and through the transmitter located at user $R_1,T_1$. In like manner, the receiver at user $R_2,T_2$ controls the transmitter timing at user $R_1,T_1$ by means of the transmitter at user $R_2,T_2$.

Figure 2:
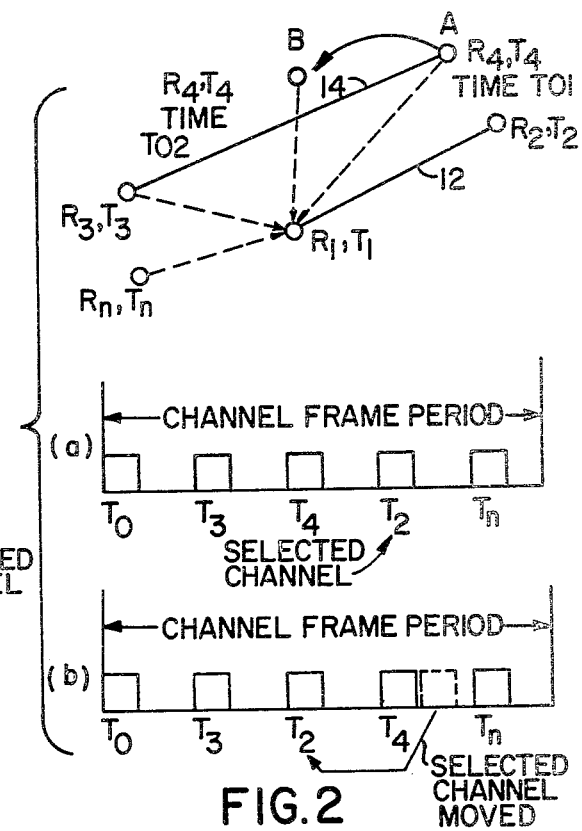
FIG. 2 is a simplified illustration of the adaptive feature of the accessing system as it relates to the switching to a vacant channel in accordance with the invention.

The arrangement of FIG. 2 pictorially illustrates the communications link 12 between the users $R_1,T_1$ and $R_2,T_2$, along with the communications link 14 between the users $R_3,T_3$ and $T_4,T_4$, with the understanding that of these four users, that user at $R_4,T_4$ is in motion at the time while the other three users are stationary. As illustrated in the inset "a" the pulse communications received by the user $R_1,T_1$ at time $t_{01}$ occurs during the selected channel $T_2$, but that pulse communications being transmitted by the user $R_4,T_4$ threaten to be received during the selected channel period. In inset "b", the user $R_4,T_4$ has completed its movement from point A to point B at time $t_{02}$ such that the transmissions from user $R_4,T_4$ are very close to being received by the user $R_1,T_1$ during the selected frame channel interval $T_2$. However, and as will be seen in the description that follows, the apparatus of the present invention provides a self-adaptive feature which operates to move the selected channel period $T_2$ from its original, to a new vacant channel, so as to avoid the interference otherwise receivable from the moving user $R_4,T_4$. (As will be readily appreciated by those skilled in the art, if all users of the mobile communication systems were stationary or halted during communications, then each user could remain in the selected channel interval during the entire time of communication. It is only in applications which require communications while on the move, that it becomes necessary to monitor how the used time slots vary and to adaptively switch to a vacant channel when another user moves to the channel which is occupied.)

In accordance with one aspect of the present invention, a loop-around timing approach is utilized whereby the timing of the transmitted pulses of each user is controlled by the receiver of the user he is communicating with, to enable each user to keep his received pulse signal in an unused time slot. In a second aspect of the invention, perfect (lobeless) multiplexed noise codes are employed to great advantage in providing a wave form having a single, high amplitude peak, completely free from spurious peaks of lower amplitude elsewhere in the wave form. As to the self-adaptive feature, at the user $R_1,T_1$ where the desired transmissions from the user $R_2,T_2$ are being received by means of an antenna 20 along with interfering transmissions from the user $R_4,T_4$, the receiving portion 21 compresses the noise code of the respective transmissions in a spread spectrum compressor 22 into single lobeless pulses, video detects the pulses in the detector 24 and then demodulates the pulse code information as voice or data in the unit 26. The demodulated output is also applied to a separator control unit 28 constructed to separate the timing control data information from the demodulated output and to apply such information as a control signal for a variable time delay unit 30 to advance or retard (as appropriate) the pulse train which is transmitted by the user $R_1,T_1$ along with intelligence signals from unit 32 which are modulated, spread spectrum coded, amplified and radiated by the combined actions of the units 34, 36, 38, 40 to the user $R_2,T_2$.

Additionally, the composite video pulse train developed from the communications information transmitted by the antenna 42 of the user $R_2,T_2$ is provided by the video detector 24 with both information signals from the user $R_2,T_2$ as well as from other potentially interfering users, such as $R_4,T_4$ in the arrangement of FIG. 2. The output from the detector 24 is shown fed to a time discriminator 44 from where the available free channels (or time slots) can be established relative to a reference time slot $t_0$ in unit 46, which can be obtained either from an internal, local clock, or from a common, very stable master clock in the system. By developing a control signal that is proportional to the time difference between $t_0$ and the vacant slot to be selected, any free or vacant channel can thus be developed, with a gate generator 48 then being employed to further modulate the pulses modulated with the voice or data information, spread spectrum noise coded and transmitted back from antenna 40 to the user $R_2,T_2$. The timing information received by the user $R_2,T_2$ along its antenna 50 will be de-multiplexed out, or separated out by its receiver 52, and used to alter a timing control configuration 54 so as to control the timing of the pulse train transmitted back from antenna 42 to the user $R_1,T_1$ so as to move the received channel time slot to one which is unused, and not threatened by any interfering user. In construction, the time discriminator 44 may be of any of a variety of forms, one of the simplest of which being a time display which an operator manually adjusting the time control information 56 for transmission to the other users on the link. Other, automatic means of selecting a vacant available time slot, could also be utilized, such as searching for and selecting the first unused slot, or, perhaps, selecting the slot in the center of the widest unused group of time slots. In any event, the user $R_1,T_1$ is able to seek what appears to him to be a vacant or available time slot channel on a demand assigned basis—and, although the time slots of other users would vary in time relative to any other specific user, for ground mobile users the time variation is sufficiently slow to permit the user to adaptively switch a vacated time slot when time coincidence (or interference) from another user is threatened due to the relative time variations of the pulses of other users which result from doppler. Since the foregoing system is orthogonal in operation, perfect (lobeless) noise codes will be seen to be utilizable to great advantage.

As is described in my issued U.S. Pat. Nos. 3,461,451, 3,519,746 and 3,634,765, for example, a number of classes of codes (i.e. pairs of code signals termed code mates) have amplitudes and autocorrelation functions which provide a peak output at a given time and a zero output (or outputs having the same magnitude but opposite polarity) at all other times. When the code mates are detected and the resultant detected outputs are linearly added, there is provided an impulse output of high amplitude at one given time and a zero output at all other times.

Figure 4:
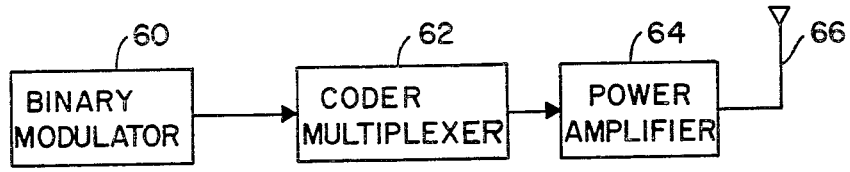
FIG. 4 is a functional block diagram of the transmitting portion of such a communications systems employing multiplexed coding.
Figure 3:
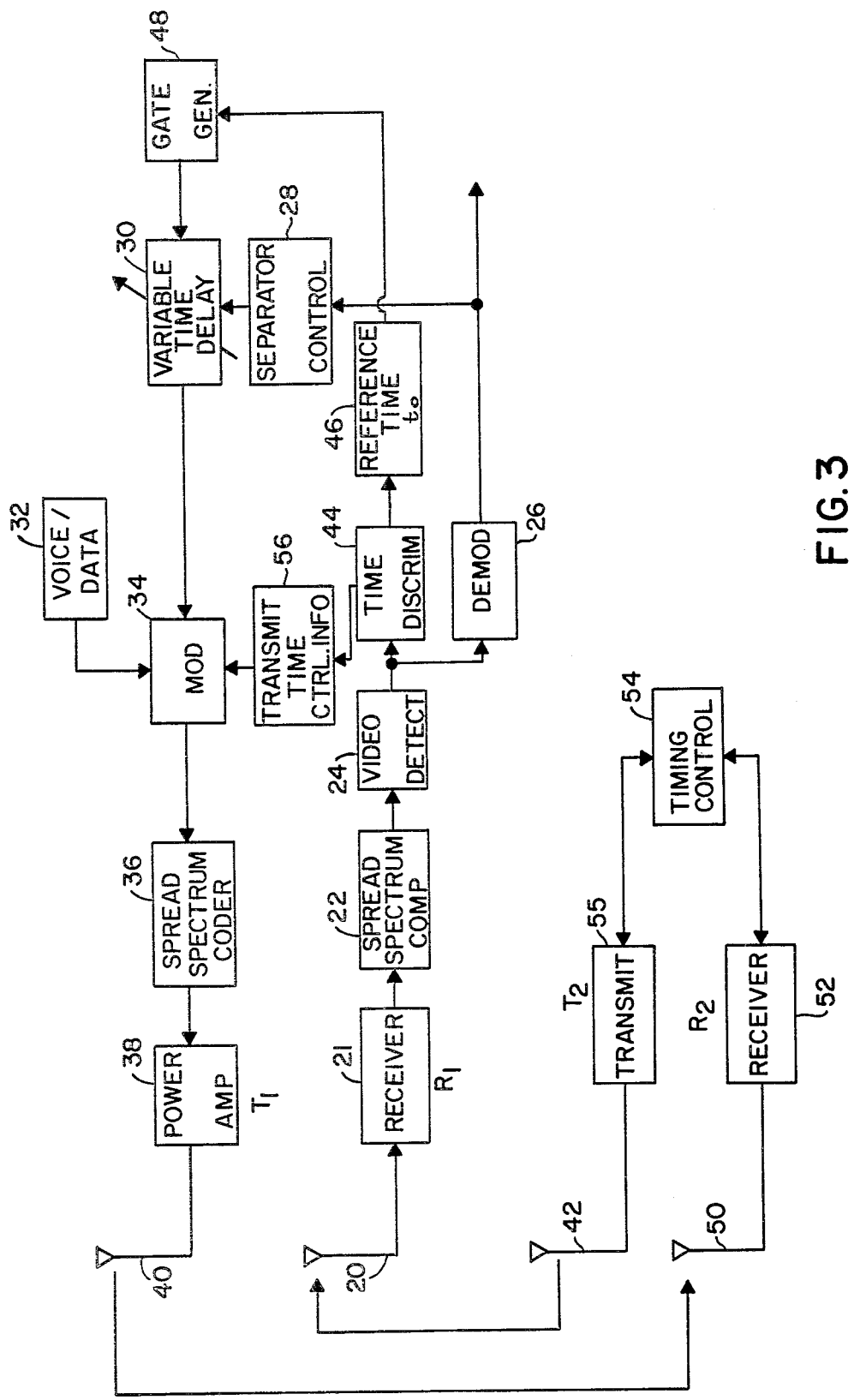

To utilize multiplexed coding in the time division multiple access communications systems shown in FIG. 3, a simplified version (FIG. 4) is illustrated, in which a binary modulator 60, a coder-multiplexer 62, a power amplifier 64 and an antenna 66 are included. These units may be located at the mobile subscriber, with the modulator 60 and coder-multiplexer 62 comprising clock, synchronizing generator, code generator and mixing apparatus to provide propagation by the omnidirectional antenna 66. As will become clear from the discussion that follows, the coder-multiplexer 62 is designed such that code mate pairs are transmitted which compress to a single impulse, lobelessly.

Figure 5:
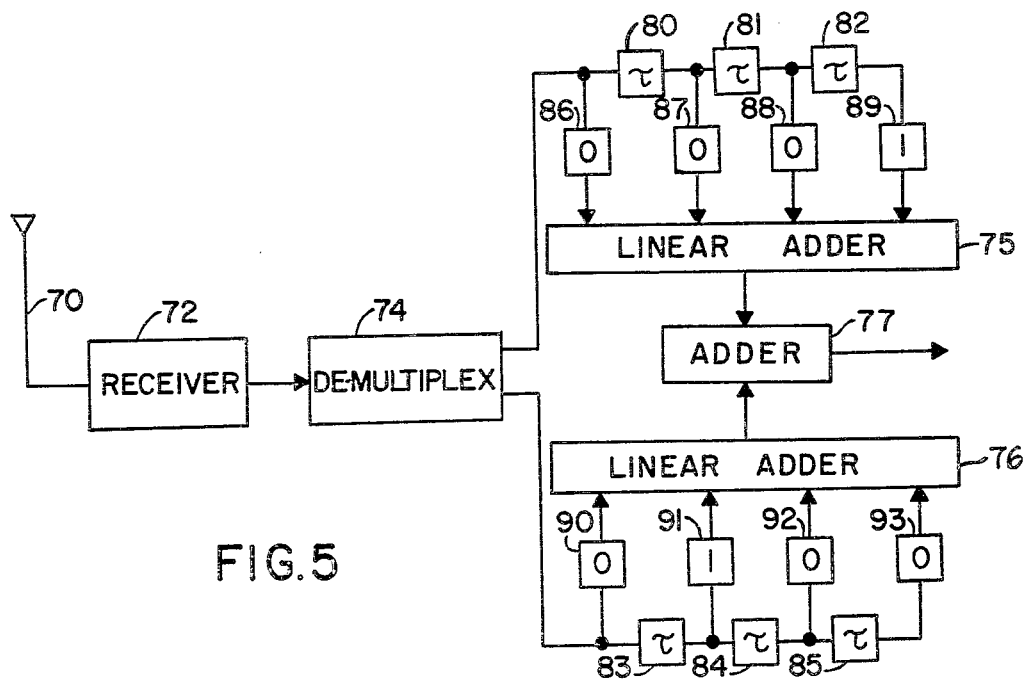
FIG. 5 is a functional block diagram of the receiving portion of such a communications system for use with a multiplexed code constructed according to the invention.

FIG. 5 symbolically shows a receiver arrangement for the multiplexed coding system, for use in an illustrative manner with mate code pairs which meet the autocorrelation requirements and in which:

Code (a) = 1000

Code (b) = 0010 where:
 0 indicates a plus (+)
 1 indicates a minus (−)

The arrangement will be seen to incorporate an antenna 70, coupled to a receiver 72, the output of which is applied to a de-multiplexer 74. The remaining elements essentially comprise a matched filter configuration, with the construction being physically located at the mobile subscriber.

Referring more particularly, to the construction of FIG. 5, it will be seen that a pair of linear adders 75, 76 are included, with the outputs of each being applied to a further adder 77, which provides the output signal. The input signals to the adders 75, 76, on the other hand, are provided, after de-multiplexing, by means of a plurality of time delay circuits and by means of a plurality of phase control circuits. Specifically, the circuits 80, 81, 82, 83, 84, 85 each delay the detected code signal by one time slot of the synchronous timing cycle. The phase control circuits 86, 87, 88, 89, 90, 91, 92, 93 are of construction to provide a signal feedthrough either with 0° or 180° phase shift, depending upon the specific code mate operated upon. In FIG. 5, the circuits identified by the reference numerals 86, 87, 88, 90, 92 and 93 provided zero phase reversal for the code signal, whereas the circuits 89 and 91 provide the 180° phase reversal required. In the description that is shown, it will be understood that the inclusion of a "0" within these phase control circuits represents a signal feedthrough with zero phase alteration while the inclusion of a "1" indicates a phase reversal of 180°.

The compression of the code 1000 in the top portion of the matched filter of FIG. 5 is illustrated as follows, with the last line indicating the autocorrelation function from adder 75.

| Time Slot | 1 | 2 | 3 | 4 | 5 | 6 | 7 |
|---|---|---|---|---|---|---|---|
| Pulse | 0 | 1 | 0 | 0 | 0 | | |
| Comp. | 0 | | 1 | 0 | 0 | 0 | |
| Filter | 0 | | | 1 | 0 | 0 | 0 |
| | | | | 1 | 0 | 1 | 1 |
| $\phi a(\tau)$ Filter Output | 1 | . | 0 | $0^4$ | 0 | . | 1 |

(In the foregoing table, it will be appreciated that the exponent indicates the amplitude).

The compression of the code 0010 in the bottom portion of the matched filter of FIG. 5 is illustrated by the following table, where the last line indicates the autocorrelation function from the adder 76.

| Time Slot | 1 | 2 | 3 | 4 | 5 | 6 | 7 |
|---|---|---|---|---|---|---|---|
| Pulse | 0 | 0 | 0 | 1 | 0 | | |
| Comp. | 1 | | 1 | 1 | 0 | 1 | |
| Filter | 0 | | | 0 | 0 | 1 | 0 |
| | 0 | | | | 0 | 0 | 1 | 0 |
| $\phi b(\tau)$ Filter Output | 0 | . | 1 | $0^4$ | 1 | . | 0 |

The following table—and, specifically, the last line therein—illustrates the output signal of the adder 77, showing that the linear sum of the orthogonally multiplexed filter outputs results in a compression of the composite code to a single impulse.

| Time Slot | 1 | 2 | 3 | 4 | 5 | 6 | 7 |
|---|---|---|---|---|---|---|---|
| | 1 | . | 0 | $0^4$ | 0 | . | 1 |
| | 0 | . | 1 | $0^4$ | 1 | . | 0 |
| Σ | . | . | . | $0^8$ | . | . | . |

In applying the example code pairs in the time division multiple accessing system of the present invention, it will be helpful to first consider an uncoded system with three users accessing the system with the selected channels occupying the three time slots of one user in the first, second and fourth time slot positions. Different amplitudes and phases will be assumed for the separate users accessing the system to demonstrate that utilizing perfect noise codes enables the system to be performed with no self-interference even for large differences in received power levels. The amplitudes and phases of the three users, will be assumed to be +1, +4 and −2. With the three users occupying these time slots, the summed output will appear thusly:

| Time Slot | 1 | 2 | 3 | 4 |
|---|---|---|---|---|
| User #1 | 0 | | | |
| User #2 | | $0^4$ | | |
| User #3 | | | | $1^2$ |
| Σ | 0 | $0^4$ | | $1^2$ |

The following table illustrates both the multiplexed code signals that would be received by these three accessing users, as well as the linear sum of the coded signals as would appear at the multiple access inputs of the receiving units. The code signal received by user #2 will be seen to be of four times the amplitude and of the same phase as the signal received by user #1, while the code signal received by user #3 will be seen to be of twice the amplitude and of the opposite polarity as the code signal received by user #1.

| Time Slot | −3 | −2 | −1 | +1 | +2 | +3 | +4 |
|---|---|---|---|---|---|---|---|
| User #1 | 1 | 0 | 0 | 0 | | | |
| User #2 | | $1^4$ | $0^4$ | $0^4$ | $0^4$ | | |
| User #3 | | | | $0^2$ | $1^2$ | $1^2$ | $1^2$ |
| Σ (a) | 1 | $1^3$ | $0^5$ | $0^7$ | $0^2$ | $1^2$ | $1^2$ |

In a similar manner the composite signal for code (b) is as follows:

| Time Slot | −3 | −2 | −1 | +1 | +2 | +3 | +4 |
|---|---|---|---|---|---|---|---|
| User #1 | 0 | 0 | 1 | 0 | | | |
| User #2 | | $0^4$ | $0^4$ | $1^4$ | $0^4$ | | |
| User #3 | | | | $1^2$ | $1^2$ | $0^2$ | $1^2$ |
| Σ (b) | 0 | $0^5$ | $0^3$ | $1^5$ | $0^2$ | $0^2$ | $1^2$ |

The only difference between the foregoing two tables being that the first represents the condition for the code (a) inputs while the second represents that for the code (b) inputs.

Pulse compressing the composite outputs in their respective matched filters and linearly adding them produces the following. Pulse compressing the code (a) composite output.

| Time Slot | −3 | −2 | −1 | +1 | +2 | +3 | +4 | +5 | +6 | +7 |
|---|---|---|---|---|---|---|---|---|---|---|
| Pulse | 0 | 1 | $1^3$ | $0^5$ | $0^7$ | $0^2$ | $1^2$ | $1^2$ | | |
| Comp. | 0 | | 1 | $1^3$ | $0^5$ | $0^7$ | $0^2$ | $1^2$ | $1^2$ | |
| Filter | 0 | | | 1 | $1^3$ | $0^5$ | $0^7$ | $0^2$ | $1^2$ | $1^2$ |
| | 1 | | | 0 | $0^3$ | $1^5$ | $1^7$ | $1^2$ | $0^2$ | $0^2$ |
| $\Sigma\phi a(\tau)$ Filter Output | 1 | $1^4$ | 0 | $0^{10}$ | $0^{17}$ | $0^2$ | $1^9$ | $1^6$ | . | $0^2$ |

Pulse compressing the composite output for code (b) results in:

| Time Slot | −3 | −2 | −1 | +1 | +2 | +3 | +4 | +5 | +6 | +7 |
|---|---|---|---|---|---|---|---|---|---|---|
| Pulse | 0 | 0 | $0^5$ | $0^3$ | $1^5$ | $0^2$ | $0^2$ | $1^2$ | | |
| Comp. | 1 | | 1 | $1^5$ | $1^3$ | $0^5$ | $1^2$ | $1^2$ | $0^2$ | |

-continued

| Time Slot | −3 | −2 | −1 | +1 | +2 | +3 | +4 | +5 | +6 | +7 |
|---|---|---|---|---|---|---|---|---|---|---|
| Filter 0 | | | 0 | $0^5$ | $0^3$ | $1^5$ | $0^2$ | $0^2$ | $1^2$ | |
| 0 | | | | 0 | $0^5$ | $0^3$ | $1^5$ | $0^2$ | $0^2$ | $1^2$ |
| Σφb(τ) Filter Output | 0 | $0^4$ | 1 | $1^2$ | $0^{15}$ | $1^2$ | $1^7$ | $0^6$ | . | $1^2$ |

The linear sum of the two matched filter output then yields

| Time Slot | −3 | −2 | −1 | +1 | +2 | +3 | +4 | +5 | +6 | +7 |
|---|---|---|---|---|---|---|---|---|---|---|
| Σφa (τ) | 1 | $1^4$ | 0 | $0^{10}$ | $0^{17}$ | $0^2$ | $1^9$ | $1^6$ | . | $0^2$ |
| Σφb (τ) | 0 | $0^4$ | 1 | $1^2$ | $0^{15}$ | $1^2$ | $1^7$ | $0^6$ | . | $1^2$ |
| Σφ$_T$(τ) | . | . | . | $0^8$ | $0^{32}$ | . | $1^{16}$ | . | . | . |

The two major factors to note from this last table are that the compressed information bits are totally non-interfering and the received signal voltage is eight times greater than for an uncoded time division multiplex accessing system. This factor of eight is simply the time-bandwidth product or, equivalently, the number of noise code bits contained in each information bit. This increase of eight times in the signal voltage provides the advantageous result of increasing the signal-to-noise power ratio by that same factor, as well as the signal-to-jamming power ratio in a hostile environment. In usage, the specific, selected time slot for the user (for example, time slot #4) is simply gated out prior to the modulation of the information to provide an output that is totally non-interfered with by other users and which simultaneously provides a protection against jammers equal to the number of accesses with no required increase in bandwidth.

Analysis has shown that it would take about eight seconds for a pulse to move 1 bit width in an application providing 100 access channels at a channel rate of 16 Kb/s for a mobile communication environment where a subscriber's vehicle is moving at a constant velocity difference as regards an interfered user of 50 mph. This is sufficiently slow to enable implementation of the described system for adaptively changing the time slot used during a call. Additionally, if a system were designed to accommodate 1000 access channels, then a 1000 bit noise code could be utilized, to result in reducing the interference power of a jammer by 1000/1 or 30 db. Simultaneously, the output signal-to-noise power ratio would be enhanced by 30 db over a timr division multiple access system using no noise coding and the same peak power.

While there has been described what is considered to be a preferred embodiment of the present invention, it will be readily apparent to those skilled in the art that modifications may be made by implementation of different perfect code mates and yet still provide the improvements in signalling and power characteristics which result. To carry out the teachings herein, all that would be necessary would be to select the perfect code mate pairs to be used and to arrange the phase control circuits of FIG. 5 in an appropriate relationship with respect to them. Alternatively, multi-dimensional codes could be utilized in the proposed system, as multiplexed codes which are time coded concurrently with generating a multiplexed binary code pair to provide a composite (i.e., multi-dimensional) code structure which retains zero lobes in the time domain while simultaneously providing very low side-lobes throughout the ambiguity diagram. As this would render the users with a sufficiently large doppler non-interference even when they moved into the time slot being used, such a system using this code class has the potential of providing available time frequency slots that is significantly greater then the time-bandwidth product. Such multiplexed codes are more particularly described in my U.S. Pat. No. 3,917,999.

I claim:

1. In a mobile multiple subscriber access system, the combination therewith of:
   first means at a given one of said subscribers for receiving desired communications signals from a desired subscriber during a selected time interval in a frame period;
   second means at said given subscriber for detecting the presence of extraneous communications signals from undesired subscribers tending to produce interference with said desired signals from said desired subscriber during said selected time interval as individual subscribers move about in said mobile access system; and
   third means at said given subscriber responsive to the presence of said extraneous communications signals which exceed a predetermined signal level to control the timing of said desired communications signals from said desired subscriber to select a different, unused time interval within said frame period for transmission of said desired communications signals.

2. The combination of claim 1 wherein said third means is manually controllable to switch said desired communications signals as said interference reaches said predetermined level.

3. The combination of claim 1 wherein said third means is automatically controlled to switch said desired communications signals as said interference reaches said predetermined level.

4. The combination of claim 1 wherein each subscriber in said mobile access system is provided with receiver and transmitter apparatus, wherein said first and second means are incorporated within the receiver apparatus of a first subscriber, and wherein said third means is operative to transmit a control signal from said first subscriber to a second subscriber in communication therewith, to change the time of communications transmissions by said second subscriber to said first subscriber within said channel frame period.

5. The combination of claim 4 wherein the transmissions of said first and second subscribers to each other are substantially time synchronous.

6. The combination of claim 5 wherein the operations of the receiver and of the transmitter apparatus of said first and second subscribers are synchronously controlled by interval timing sources incorporated therein.

7. The combination of claim 1 wherein each subscriber in said mobile access system is provided with receiver and transmitter apparatus, and wherein said transmitter apparatus includes:
- means for generating a pair of coded signals;
- means for generating a timing reference signal; and
- means for multiplexing said coded signals with said timing reference signal for communication of said coded signals to subscribers accessing said system at selected time intervals in said channel frame period;
- and wherein said coded signal generating means generates a pair of coded signals which upon receipt and detection by a subscriber in desired communication therewith produces an output signal having an impulse autocorrelation function during its selected time interval in said channel frame period.

8. The combination of claim 7 wherein said coded signal generating means generates first and second sequences of coded pulses, the pulses of which have predetermined code patterns, different one from another, but related thereto in that upon receipt and detection, the autocorrelation function of each code will be of substantially equal magnitude and opposite polarity, or zero, for all intervals of time, other than during said selected time interval in said channel frame period.

9. The combination of claim 7 wherein said coded signal generating means includes a plurality of code generators, one for each of said pair of coded signals, wherein said timing reference signal generating means includes a synchronizing signal generator, wherein said multiplexing means includes a multiplexer coupled to said code and synchronizing said generators, and a transmitter coupled to said multiplexer, and wherein said receiver apparatus includes a receiver coupled to said transmitter, a demultiplexer coupled to said receiver, and an autocorrelation detector coupled to said demultiplexer to provide said output signal.

* * * * *